US008948534B2

United States Patent
Zha et al.

(10) Patent No.: US 8,948,534 B2
(45) Date of Patent: Feb. 3, 2015

(54) MRI GIBBS' RINGING FILTERING WITH EDGE-PROTECTION

(75) Inventors: Leping Zha, Round Lake, IL (US); Mitsue Miyazaki, Mount Prospect, IL (US)

(73) Assignees: Kabushiki Kaisha Toshiba, Minato-Ku, Tokyo (JP); Toshiba Medical Systems Corporation, Otawara-Shi, Tochigi-Ken (JP)

( * ) Notice: Subject to any disclaimer, the term of this patent is extended or adjusted under 35 U.S.C. 154(b) by 705 days.

(21) Appl. No.: 13/092,382

(22) Filed: Apr. 22, 2011

(65) Prior Publication Data

US 2012/0269414 A1 Oct. 25, 2012

(51) Int. Cl.
G06K 9/40 (2006.01)
G06T 5/10 (2006.01)
G06T 5/00 (2006.01)

(52) U.S. Cl.
CPC . *G06T 5/10* (2013.01); *G06T 5/002* (2013.01); G06T 2207/10088 (2013.01); G06T 2207/20056 (2013.01); G06T 2207/20192 (2013.01); G06T 2207/30004 (2013.01); G06T 2207/30016 (2013.01)
USPC ....................................................... 382/260

(58) Field of Classification Search
CPC ............................ G01R 33/5611; G06T 5/002
USPC ....................................................... 382/260
See application file for complete search history.

(56) References Cited

U.S. PATENT DOCUMENTS

| 5,001,429 | A | | 3/1991 | Constable et al. |
| 5,285,157 | A | | 2/1994 | Zur |
| 5,345,173 | A | | 9/1994 | Bito et al. |
| 5,602,934 | A | | 2/1997 | Li et al. |
| 6,114,852 | A | * | 9/2000 | Zhou et al. ..................... 324/306 |
| 6,396,269 | B1 | * | 5/2002 | Hajnal et al. .................. 324/307 |
| 7,916,144 | B2 | * | 3/2011 | Schiwietz et al. ............. 345/501 |
| 8,139,891 | B2 | * | 3/2012 | Chang et al. ................... 382/274 |
| 8,428,324 | B2 | * | 4/2013 | Heinlein et al. ............... 382/131 |
| 8,502,538 | B2 | * | 8/2013 | Dannels et al. ............... 324/318 |
| 2009/0185733 | A1 | | 7/2009 | Heinlein et al. |

OTHER PUBLICATIONS

S. Amartur, et al., "Modified Iterative Model Based on Data Extrapolation Method to Reduce Gibbs Ringing," *J. Mag, Res. Imag.*, vol. 1, No. 3, pp. 307-317 (1991).

(Continued)

*Primary Examiner* — Matthew Bella
*Assistant Examiner* — Dennis Rosario
(74) *Attorney, Agent, or Firm* — Nixon & Vanderhye PC (57) ABSTRACT

A magnetic resonance image (MRI) data array representing an image is filtered in k-space (Fourier space) domain to produce a low-pass filtered data array, a band-pass filtered data array and a high-pass filtered data array. These filtered k-space arrays are two-dimensionally Fourier-Transformed into the image domain where the magnitude of the band-pass filtered data array is thresholded and feathered to produce a fuzzy continuous valued ("gray-scale") edge mask data array, and the real part of the high-pass filtered data array may, if desired, be soft-thresholded to produce a soft thresholded sharpening mask data array. The edge mask data array is multiplied with the sharpening mask data array and the result is added to the magnitude of the low-pass filtered data array in the image domain to produce a Gibbs' ringing and noise-filtered image to better represent the underlying anatomy.

9 Claims, 3 Drawing Sheets

(56) References Cited

OTHER PUBLICATIONS

S. Amartur, et al., "Phase Constrained Data Extrapolation Method for Reduction of Truncation Artifacts," *J. Mag. Res. Imag.*, vol. 1, No. 6, pp. 721-724 (1991).

R. Archibald, et al., "A Method to Reduce the Gibbs Ringing Artifact in MRI Scans While Keeping Tissue Boundary Integrity," *IEEE Trans. Med. Imag.*, vol. 21, No. 4, pp. 305-319 (2002).

K. Block, et al., "Suppression of MRI Truncation Artifacts Using Total Variation Constrained Data Extrapolation," *Int. J. of Biomed. Imag.*, 8 pp., ID 184123 (2008).

R. Constable, et al., "Data Extrapolation for Truncation Artifact Removal," *Mag. Res. Med.*, vol. 17, pp. 108-118 (1991).

R. Mahesh, et al., "Truncation Artifact Reduction in MRI with a New Class of Filters," Proceedings of the International Society for Magnetic Resonance in Medicine (ISMRM), 7$^{th}$ Scientific Meeting, 178 (1999).

L. Friedman, et al., "Reducing Inter-Scanner Variability of Activation in a Multicenter fMRI Study: Role of Smoothness Equalization," *NeuroImage*, vol. 32, pp. 1565-1668 (2006).

M. Lowe, et al., "Spatially Filtering Functional Magnetic Resonance Imaging Data," *Mag. Res. Med.*, vol. 37, pp. 723-729 (1997).

Office Action dated Mar. 3, 2014 in CN 201210118720.9.

"Digital Image Processing and Analysis," Jul. 31, 2006, Tsinghua University Press with English translation.

"Digital Image Processing and Analysis," Jul. 31, 2006, Tsinghua University Press with English translation, pp. 1-79.

\* cited by examiner

MRI GIBBS' RINGING FILTERING WITH EDGE-PROTECTION

FIELD

The subject matter below relates generally to magnetic resonance imaging (MRI) processes. Preferably, the MRI processes described below involve enhancements to filtering of acquired MRI data to reduce Gibbs' ringing artifacts and noise while enhancing edges and detail in a reconstructed image.

DETAILED DESCRIPTION

Figure 1:
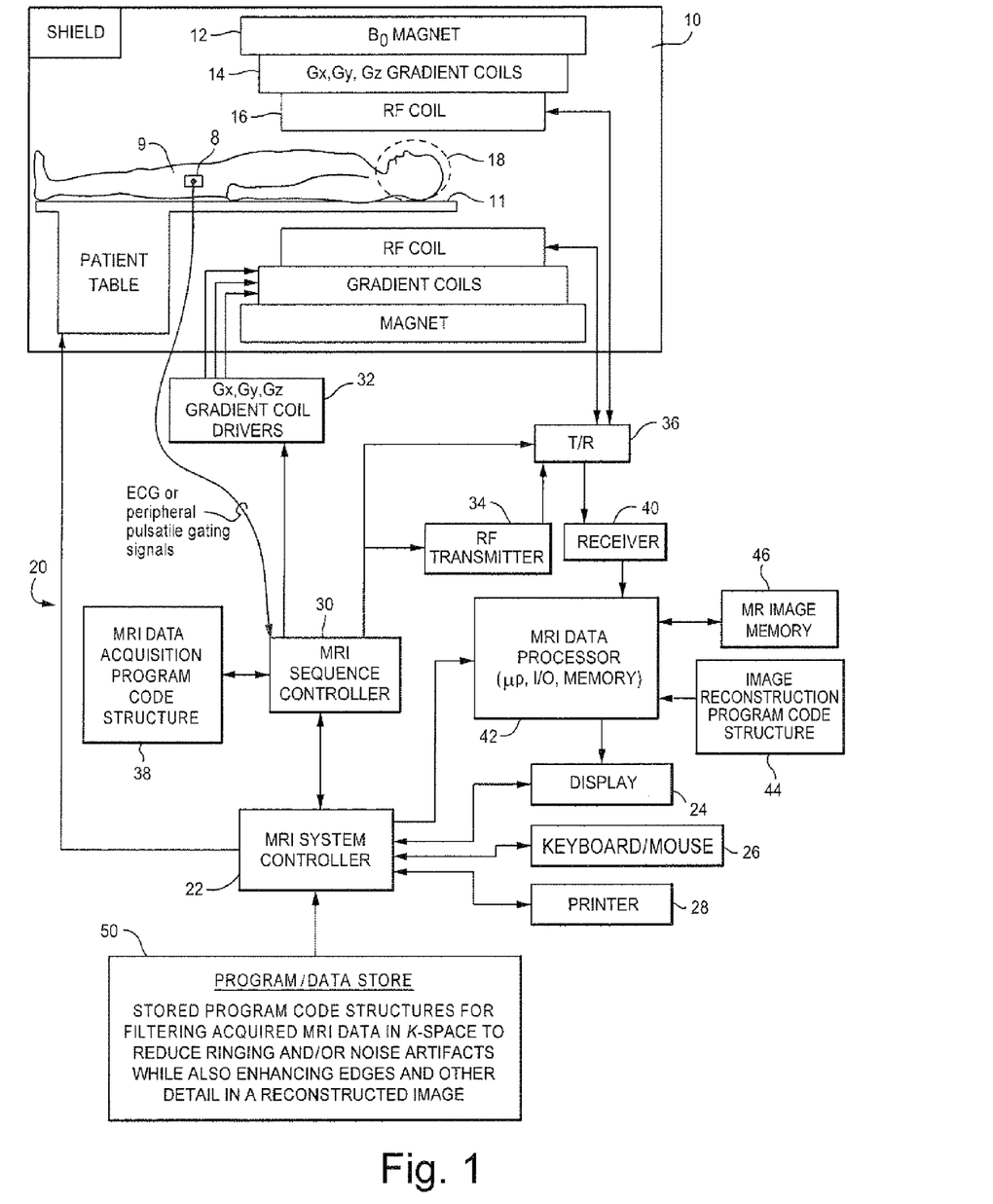
FIG. 1 is a high-level schematic block diagram of an exemplary MRI system embodiment adapted to acquire and filter MRI data to reduce Gibbs' ringing artifacts while yet enhancing edges and detail in a reconstructed image.

The MRI system shown in FIG. 1 includes a gantry 10 (shown in schematic cross-section) and various related system components 20 interfaced therewith. At least the gantry 10 is typically located in a shielded room. One MRI system geometry depicted in FIG. 1 includes a substantially coaxial cylindrical arrangement of the static field BO magnet 12, a $G_x$, $G_y$ and $G_z$ gradient coil set 14 and an RF coil assembly 16. Along the horizontal axis of this cylindrical array of elements is an imaging volume 18 shown as substantially encompassing the head of a patient 9 supported by a patient table 11.

An MRI system controller 22 has input/output ports connected to display 24, keyboard/mouse 26 and printer 28. As will be appreciated, the display 24 may be of the touch-screen variety so that it provides control inputs as well.

The MRI system controller 22 interfaces with MRI sequence controller 30 which, in turn, controls the $G_x$, $G_y$ and $G_z$ gradient coil drivers 32, as well as the RF transmitter 34 and the transmit/receive switch 36 (if the same RF coil is used for both transmission and reception). As those in the art will appreciate, one or more suitable body electrodes 8 may be affixed to the patient's body to provide ECG (electrocardiogram) and/or peripheral pulsatile gating signals to the MRI sequence controller 30. The MRI sequence controller 30 also has access to suitable program code structure 38 for implementing MRI data acquisition sequences already available in the repertoire of the MRI sequence controller 30 to generate MR images using operator and/or system inputs defining particular data acquisition sequence parameters.

The MRI system 20 includes an RF receiver 40 providing input to data processor 42 so as to create processed image data to display 24. The MRI data processor 42 is also configured for access to image reconstruction program code structure 44 and to MR image memory 46 (e.g., for storing MR image data and/or intermediate result data derived from processing in accordance with the exemplary embodiments and the image reconstruction program code structure 44).

Also illustrated in FIG. 1 is a generalized depiction of an MRI system program/data store 50 where stored program code structures (e.g., for filtering acquired MRI data in k-space to reduce ringing and/or other artifacts while also enhancing edges and other detail in a reconstructed image) are stored in computer-readable storage media accessible to the various data processing components of the MRI system. As those in the art will appreciate, the program store 50 may be segmented and directly connected, at least in part, to different ones of the system 20 processing computers having most immediate need for such stored program code structures in their normal operation (i.e., rather than being commonly stored and connected directly to the MRI system controller 22).

Indeed, as those in the art will appreciate, the FIG. 1 depiction is a very high-level simplified diagram of a typical MRI system with some modifications so as to practice exemplary embodiments to be described hereinbelow. The system components can be divided into different logical collections of "boxes" and typically comprise numerous digital signal processors (DSP), microprocessors, special purpose processing circuits (e.g., for fast A/D conversions, fast Fourier transforming, array processing, etc.). Each of those processors is typically a clocked "state machine" wherein the physical data processing circuits progress from one physical state to another upon the occurrence of each clock cycle (or predetermined number of clock cycles).

Not only does the physical state of processing circuits (e.g., CPUs, registers, buffers, arithmetic units, etc.) progressively change from one clock cycle to another during the course of operation, the physical state of associated data storage media (e.g., bit storage sites in magnetic storage media) is transformed from one state to another during operation of such a system. For example, at the conclusion of an MR-imaging reconstruction process, an array of computer-readable accessible data value storage sites (e.g., multi-digit binary representations of pixel values) in physical storage media will be transformed from some prior state (e.g., all uniform "zero" values or all "one" values) to a new state wherein the physical states at the physical sites of such an array (e.g., of pixel values) vary between minimum and maximum values to represent real world physical events and conditions (e.g., the tissues of a patient over an imaged volume space). As those in the art will appreciate, such arrays of stored data values represent and also constitute a physical structure—as does a particular structure of computer control program codes that, when sequentially loaded into instruction registers and executed by one or more CPUs of the MRI system 20, cause a particular sequence of operational states to occur and be transitioned through within the MRI system.

The exemplary embodiments described below provide improved ways to acquire and/or process MRI data acquisitions and/or to generate and display MR images.

K-space data truncation induces imaging artifacts in the form of Gibbs' ringing and has been one of the oldest, but also one of the toughest, problems to conquer in the practice of MR imaging, especially when the acquired image data matrix is small.

Truncation artifacts arise in MR images when the acquired data do not contain all of the high spatial frequency information present from the anatomical section being imaged under the presence of magnetic field gradients used in MR imaging, which convert spatial measures to frequency measures. The width of the sampling window determines the shape of the sine function that is convolved with the image. This convolution of the sinc function with the image yields Gibbs' ringing near intensity discontinuities, or high contrast edges of the image features. The ringing artifacts are especially visible and offensive along the phase encoding (PE) and/or slice encoding (SE) directions, when the number of encoding steps is small (e.g., ≤196) as influenced by acquisition time, dynamic contrast or other MRI acquisition sequence constraints. Along the readout (RO) direction, a typically long acquisition window (e.g., 256 points or greater) makes ringing artifacts usually less visible or problematic without substantially affecting acquisition time.

It has been observed and reported that, from direct image comparisons on the same resolution phantoms and subjects, artifacts have been made subject to actively applied ringing artifact reduction algorithms in MRI products for many years. However, such prior attempts leave room for improvement with respect to resulting image quality and/or efficiency of implementation (e.g., processing time, complexity, etc.).

Commonly used k-space low-pass filtering and image space weighted averaging often blurs out fine image details and reduces general edge definition. On the other end, e.g., using the much more elaborate Gegenbauer reconstruction, the "total variation (TV)" constrained data extrapolation and other extrapolation methods (Sigma filtering, which is similar to anisotropic diffusion, popular in CT) are complex and are often iterative, tend to be slow and tend to produce cartoon-like results with a piece-wise constant character, which results do not look natural for MRI because of the fine gradation nature of general soft tissue contrast expected in MRI.

Figure 2:
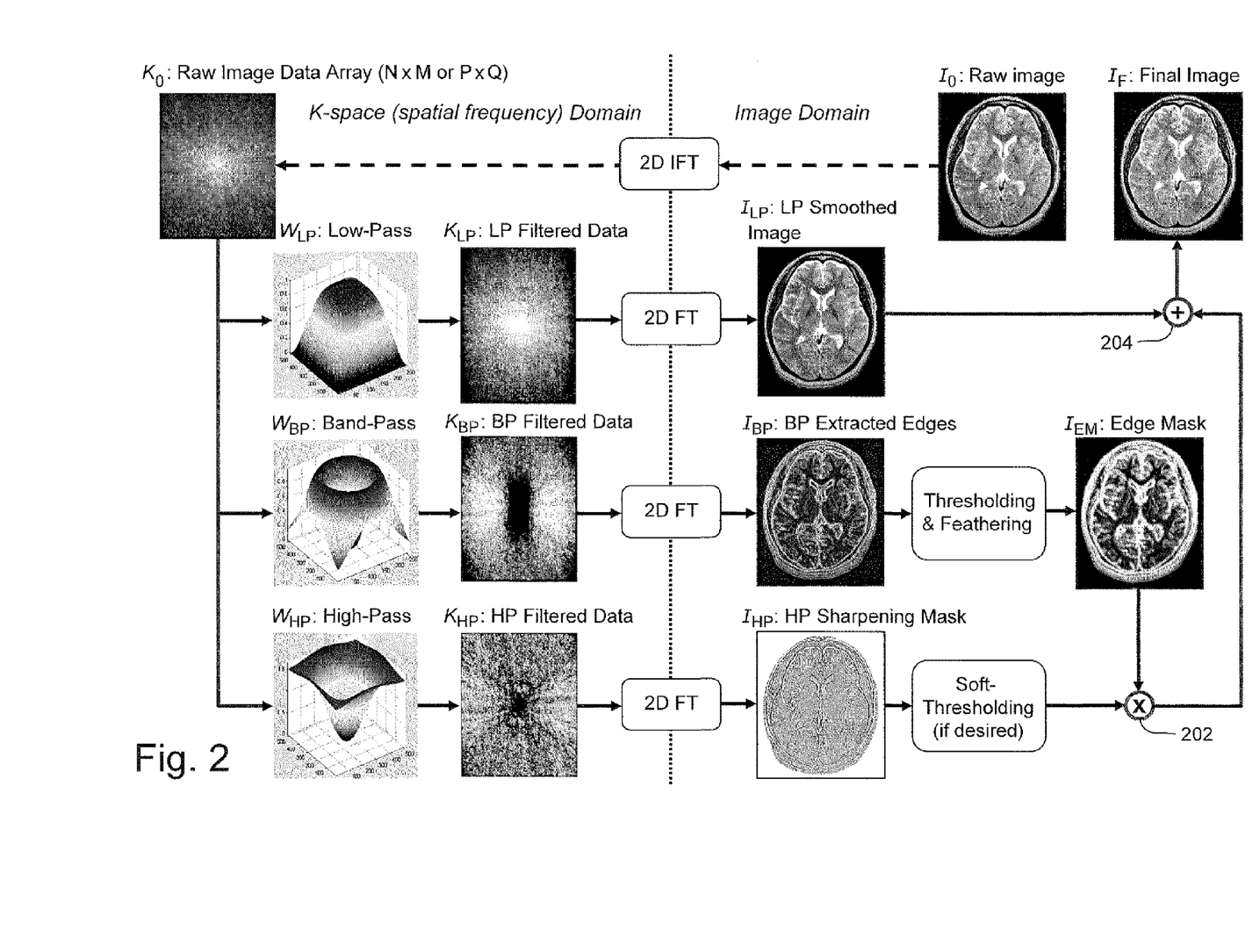
FIG. 2 is a schematic depiction of k-space domain/image domain filtering for an exemplary embodiment of filtering processes.

The following exemplary embodiment produces a simple, fast and rather straightforward method for simultaneous reduction of ringing and noise artifacts plus edge enhancement. It is based on multiplying raw k-space domain data (possibly including k-space data generated by inverse two-dimensional (2D) Fourier-Transformation from the image domain) with low-pass (LP), band-pass (BP) and high-pass (HP) windowing functions separately. The results are then two-dimensionally Fourier-Transformed to the image domain space and combined, as illustrated in FIG. 2. The k-space widowing functions are preferably optimized, with the shape of the BP filter selectively picking up edges at relatively low-resolution from a carefully controlled scope of mid- to mid-high range spatial frequencies, enabling the creation of a diffused edge mask of preferred diffusiveness, for a carefully controlled expanded edge region coverage after thresholding and feathering. The goal here is to establish just and exact matching between the active edge enhancement range of the HP Laplacian sharpening mask and the edge mask. Slow image domain convolution operations and many other slow operations, such as edge thinning commonly used in Canny edge detectors, are either (a) replaced by equivalent k-space operations or (b) avoided, since pixel thin edges are not the goal, but rather a fuzzy region around them. The sharpening mask is added back to the LP smoothed images through the BP filter derived edge masks (multiplied therewithin on a pixel-by-pixel basis).

FIG. 2 illustrates an exemplary algorithm with appropriately matched low-pass, band-pass and high-pass k-space windowing functions. The use of band-pass frequency domain filtering for edge region extraction is believed to be an important new feature of the exemplary method. The exemplary embodiment has been found efficient in removing ringing artifacts and noise from low-resolution, medium-resolution and high-resolution MR images, while at the same time enhancing edge delineation and improving fine detail visual conspicuity. The overall processed image quality is better than that from many more complicated methods in the literature and from some of the commercially available filter packages, while the relatively simple exemplary algorithm runs much faster.

As depicted in FIG. 2, an "input image" $I_0$ in the image domain may be two-dimensionally inverse Fourier-Transformed so as to create a corresponding input image k-space data array $K_0$. As will be appreciated, alternatively, the input image data array $K_0$ may be the same as that directly acquired through normal MRI data acquisition sequences performed by the system of FIG. 1 to result in the k-space raw N×M image data array $K_{raw}$ stored in a suitable memory of the MRI system (e.g., MR image memory 46 accessible to the MRI data processor 42 in FIG. 1). In either case, to avoid unnecessary complications, it is also assumed that all kinds of basic data processing procedures necessary to restore the full raw data range, such as the Partial Fourier (or "Half Fourier", "AFI", etc.) reconstructions, and Parallel Imaging reconstruction (such as SENSE, GRAPPA, SPEEDER, etc.) are all already performed, with their results already contained in the N×M "raw data" array.

By either route, the k-space input image complex data array $K_0$ may contain the acquired k-space (N×M) raw data array $K_{raw}$ within a larger (P×Q, with P>N and Q>M) k-space data array, in which values of all elements outside the N×M raw data range are zeros, a common practice in MRI called zero-fill (as will be well understood by those skilled in the art). It is common to zero-fill the raw acquired k-space data to "200%" or more, which means P≥2N and Q≥2M. For example, often low-resolution images with a small N×M acquisition array size are viewed in a larger display array size P×Q, through zero-fill or other interpolation processes and, in such cases, the input image array size as stored in the MRI system is already P×Q.

If all the pre-processing steps used to derive the larger P×Q input image array, $I_0$, or the larger P×Q k-space input data array, $K_0$, from the N×M raw data array $K_{raw}$ are linear, like in the case of direct zero-fill of raw k-space data, only the center N×M region of the P×Q sized k-space input data array $K_0$ is non-zero. This is also the case when signals from multiple-coil elements often used in modern MRI scanners are directly combined in k-space, so that the raw k-space data size does not change.

Typically, multiple-element signals are combined in image space, after they are individually two-dimensionally Fourier-Transformed, in processes that are non-linear (such as the common Sum Of Squares (SOS) combination). Even when the raw signal is not from multiple coil elements, simply absolute value operations (or image array leveling or thresholding processes involving value clippings) are also non-linear. In such non-linear situations, after inverse two-dimensional Fourier-Transformation back to k-space, there can be small "leakages" in the input k-space data array $K_0$ outside the original N×M raw data region, i.e., small, but non-zero, complex numbers located outside the (individual) raw N×M k-space data region.

In any event, it is to the range of the actually acquired (N×M) raw k-space data array $K_{raw}$ the k-space windowing (pixel-by-pixel multiplication with the windowing functions) processing is applied in accordance with this exemplary embodiment for the LP and BP filters—while, in the exemplary embodiment, the HP filter is applied to the entire P×Q input data array $K_0$ in k-space, since there can be useful high-spatial frequency components created in prior non-linear processing steps outside the original raw data N×M range. Typically, in such an acquired k-space raw data array $K_{raw}$, N equals the effective number of phase encoding increments effected in a phase encoded (PE) dimension during MRI data acquisition sequences, while M equals the effective number of frequency encoded samples obtained in a readout (RO) dimension during the MRI data acquisition scan sequences. It is this N×M array of raw k-space domain (i.e., the spatial frequency domain) that is first low-pass and then band-pass filtered as depicted in FIG. 2. The high-pass filter extends over the entire k-space array $K_0$.

As will be explained in more detail, the low-pass, band-pass and high-pass filter windows are all sized so as to substantially (if not exactly, which is always preferred) fit the raw acquired image data array of N×M data values (including the restored range of data after Partial Fourier and Parallel Imaging processing steps have already occurred, as mentioned), or the larger input data array $K_0$ for the HP filter. As is graphically depicted schematically in FIG. 2 (as an effectively three-dimensional shape), the filter widowing function fits over the range of k-space domain raw or input data array to be filtered. In the data array being filtered is a "square" array (i.e., N=M, or P=Q), then the filter kernels will conform to essentially square or circular cross-sections (if taken along the filter windowing function axes of FIG. 2). On the other hand, if N≠M, or P≠Q, then the low-pass filter will take on essentially rectangular cross-sections, while the band-pass and high-pass filters will take on essentially elliptical cross-sections.

It is particularly noted that the exemplary band-pass filter kernel in k-space will effectively extract edges in all directions—whereas Canny-type edge extraction filtering processes in the prior art typically use two orthogonal bidirectional filtering kernels in the image domain and then combine the results also in the image domain.

As FIG. 2 depicts, the input raw image data array $K_0$ is high-pass, band-pass and low-pass filtered by using respective low-pass filtering window $W_{LP}$, band-pass filtering window $W_{BP}$ and high-pass filtering widow $W_{HP}$. Respectively, on a pixel-by-pixel basis, corresponding elements of the N×M or P×Q array in the raw image data $K_0$ are multiplied by the appropriate corresponding weighting coefficient in the filtered windowing functions (i.e., the "height" of the three-dimensional shape shown in FIG. 2) so as to produce low-pass, band-pass and high-pass filtered P×Q k-space data arrays $K_{LP}$, $K_{BP}$ and $K_{HP}$. These filtered data arrays are then each separately subjected to two-dimensional Fourier-Transformation (2D FT) so as to reflect them into respectively corresponding P×Q digital image domain arrays $I_{LP}$, $I_{BP}$ and $I_{HP}$, after the magnitudes (absolute values) of the Fourier-Transformed LP and HP filtered results, and the real part of the Fourier-Transformed HP filtered results, are taken. As depicted in FIG. 2, the low-pass image domain array $I_{LP}$ represents a smoothed version of the original raw image $I_0$ (if it was actually created) or its effective counterpart (if raw acquired image data $K_0$ is used instead of an image array $I_0$ in the image domain). The band-pass filtered image domain array $I_{BP}$ represents extracted edges, while the high-pass filtered image domain array $I_{HP}$ represents a sharpening mask, which works by increasing perceived image sharpness by producing under-shoots and over-shoots at the raw edge boundaries and, therefore, increasing perceived edge contrast.

As those in the art will appreciate, simple straightforward multiplication in the Fourier frequency domain (i.e., k-space) is equivalent to convolution in the real spatial image domain. However, as is also well known, convolution processes are complex and time-consuming to implement. Furthermore, it may be difficult to derive the suitable image domain filtering convolution kernel in the image domain that would be equivalent to the k-space windowing functions used in the exemplary embodiment in k-space. Derivation of a suitable image domain convolution kernel may be more feasible for a high-pass filtering process as the Laplacian-type sharpening masks are more commonly defined and used. However, it is at least theoretically possible that one might perform all of the filtering functions in the image domain (albeit that would clearly not be a preferred embodiment due to the extra resources that would be required such as reduced processing speed).

As depicted in FIG. 2, the image domain array $I_{BP}$ representing extracted edges is subjected to thresholding and feathering processes so as to generate a continuously valued ("gray-scale") P×Q edge mask array $I_{EM}$. The P×Q sharpening mask (preferably after soft thresholding, if desired for optimum results) is then multiplied on a pixel-by-pixel basis with the P×Q edge mask array as depicted at 202 in FIG. 2. The result of that is then added on a pixel-by-pixel basis to the P×Q low-pass smoothed image array $I_{LP}$ as depicted at 204 in FIG. 2 so as to result in a final P×Q image domain array $I_F$.

Figure 3:
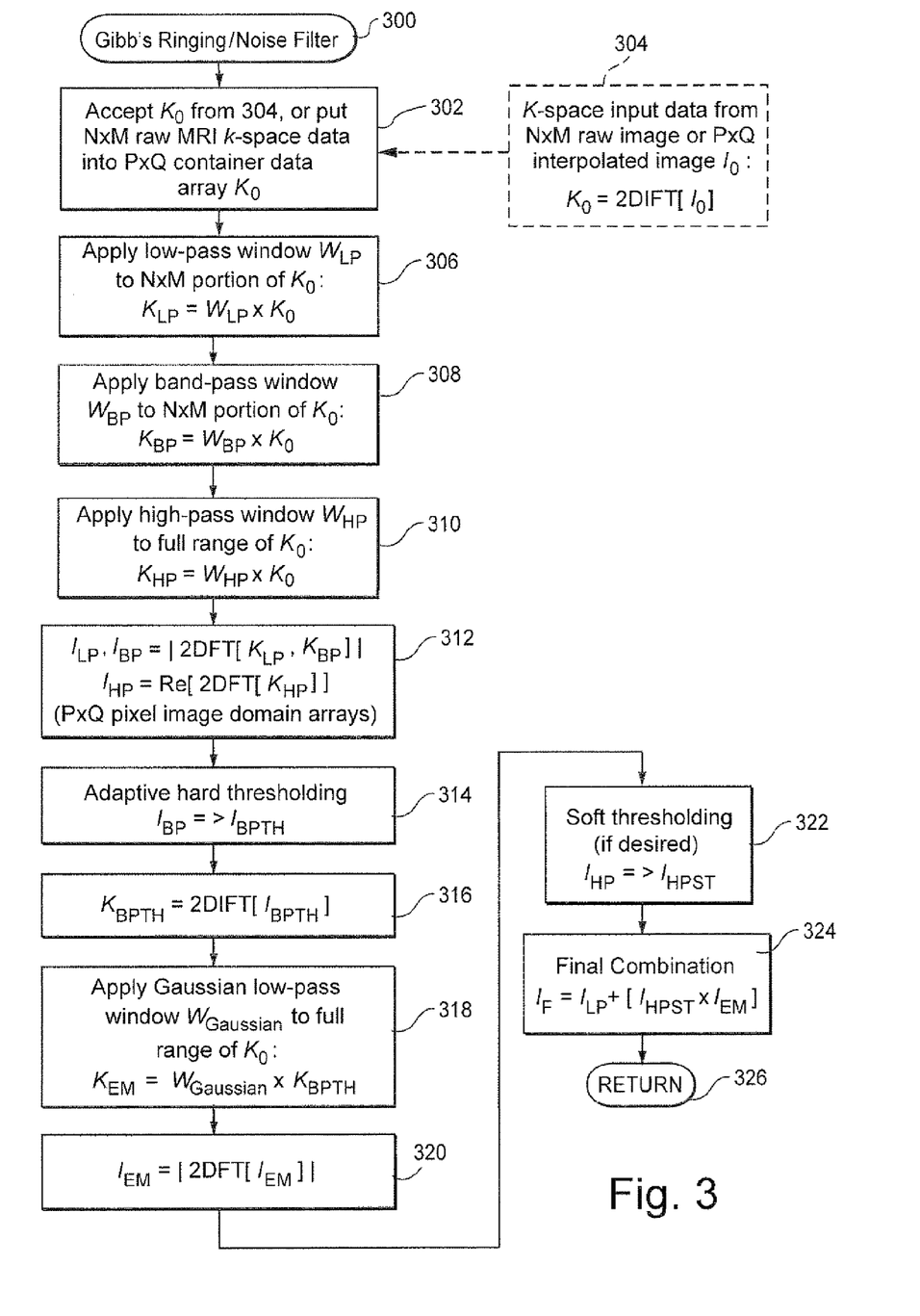
FIG. 3 is a schematic diagram of computer program code structure suitable for an exemplary embodiment, wherein at least one data processor is configured to process at least one data array in memory representing an image.

FIG. 3 depicts an exemplary computer program code structure that may be used to implement the exemplary embodiment of FIG. 2 in at least one suitably configured data processor (e.g., MRI data processor 42 in FIG. 1) using an input image array $I_0$ and/or an input data array $K_0$ stored in suitable memory in the system of FIG. 1 (e.g., the MR image memory 46 which communicates with the data processor 42).

The Gibbs' ringing/noise filter module is entered at 300. At 302, a P×Q k-space data array $K_0$ of raw MRI data is generated and/or accepted for processing (e.g., by suitable operator interface). As depicted in dotted lines at 304, if an input data array $K_0$ is not already present from the acquired data for processing (e.g., due to work flow design that the MRI system data acquisition processes), then an existing raw image array $I_0$ in the image domain may be two-dimensionally inverse Fourier-Transformed (and optionally zero-filled) so as to generate an appropriate P×Q k-space data array $K_0$ as an input to the filtering process.

In FIG. 3, at step 306, the low-pass filter windowing (the windowing function $W_{LP}$ is defined over the full P×Q input k-space data range, but preferably the non-zero range of the windowing function $W_{LP}$ is an exactly or substantially matched N×M active windowing sub-array) is applied to the P×Q k-space data array $K_0$ so as to produce a low-pass filtered P×Q k-space array $K_{LP}$. Similarly, at step 308, the substantially or exactly matched band-pass filter windowing with the non-zero active windowing range of N×M in the windowing function is applied to the input k-space data array $K_0$ so as to produce the P×Q band-pass filtered k-space array $K_{BP}$. And, at step 310, a substantially or exactly matched P×Q high-pass filter windowing is applied to the P×Q k-space data array $K_0$ so as to produce a P×Q high-pass k-space filtered array $K_{HP}$. Of course, the order of such filter processing may be arbitrarily changed, if desired.

At step 312, suitable two-dimensional Fourier-Transformations are applied to the filtered k-space arrays, followed by their absolute values (magnitudes) taken so as to generate in the image domain the filtered image domain P×Q arrays $I_{LP}$ and $I_{BP}$, and by the real part values taken from the complex valued Fourier-Transform results to generate in the image domain the filtered image domain P×Q array $I_{HP}$. The resulting image domain arrays $I_{LP}$ and $I_{BP}$ are, therefore, both positively defined (all the array element values equal to or larger than zero), while the resulting image domain array $I_{HP}$, the HP sharpening mask before soft-thresholding, naturally contains both positive and negative values around the average value, which is zero.

At step 314 in FIG. 3, the image domain band-pass filtered array $I_{BP}$ is then adaptively thresholded to create a P×Q threshold edge mask array $I_{BPTH}$, using an automatically calculated numerical threshold according to the peak and average values of the raw edge mask $I_{BP}$, in order to increase the "pass range" of the edge mask to a suitable level.

At step 316, the threshold edge mask array $I_{BPTH}$ is inversely two-dimensional Fourier-Transformed to k-space to create the corresponding P×Q complex data array $K_{BPTH}$, which is multiplied on a pixel-by-pixel basis to a P×Q Gaussian low-pass filter windowing function $W_{Gauss}$ at step 318, to create a P×Q low-pass filtered k-space edge mask complex data array $K_{EM}$. At step 320, the k-space array $K_{EM}$ is further two-dimensional Fourier-Transformed back to the image space, with its absolute value (magnitude) taken as the P×Q feathered fuzzy image domain edge mask array $I_{EM}$.

At step 322, a simple soft thresholding of the P×Q high-pass filtered image array $I_{HP}$ may be employed, if desired, to provide a soft thresholded image domain array $I_{HPST}$. The non-linear soft thresholding only affects data round origin with their value below a very small soft thresholding threshold $T_{ST}$ by decreasing the values towards zero and, therefore, reducing random noise and Gibbs' ringing possibly in the sharpening mask.

The final image $I_F$ is assembled at step 324 by multiplying the P×Q band-pass filtering produced edge mask array $I_{EM}$ to the P×Q soft thresholded high-pass filtering produced sharpening mask array $I_{HPST}$, and then adding the results to the P×Q low-pass filtering produced smooth image domain array $I_{LP}$, with all calculations being on a pixel-to-pixel basis in the image domain. A return transfer of processor control to the calling program is made at step 326 after the filtering processes of this module have been completed.

It will be understood that although the exemplary embodiment has been explained in terms of two-dimensional arrays, a three-dimensional image can be similarly filtered (e.g., by successively filtering contiguous slices in a three-dimensional volume).

Some presently preferred k-space windowing filter function kernels are set forth below, including the basic one-dimensional (1D) and the practical two-dimensional forms, when applicable.

Ia Low-Pass (LP) Windowing Functions: The Basic 1D Formulations:

N=k-space acquired data size (becomes N & M in 2D).

n=k-space pixel index (from 1 to N) (becomes $n_x$ & $n_y$ in 2D).

r, w, a, p: Parameters, with the preferred (upper) and second preferred values given as marked.

$$W(n, N)_{HBRR\_1} = 2\sin\left(\frac{\pi n}{N}\right) - \sin^2\left(\frac{\pi n}{N}\right) \quad \text{(Equation 1)}$$

$$W(n, N)_{Fermi} = \frac{1}{1+\exp\left(\frac{|n-N/2|-r}{w}\right)} \quad \text{(Equation 2)}$$

[r = (3/8) N, w = (10/128) N; or
r = (3/8) N, w = (15/128) N]

$$W(n, N)_{Exponential} = \exp\left[-\alpha\left(\frac{|n-\frac{N}{2}|}{N}\right)^p\right] \quad \text{(Equation 3)}$$

[$\alpha$ = 32, p = 4; or $\alpha$ = 96, p = 6]

Ib. Low-Pass Windowing Functions: The Basic "1D×1D" type 2D Formulations:

The windows are only defined over the N×M acquired raw data size range, and can be either square or rectangular, depending if N=M, with all values outside and range set to zeros, and the same sets of values of parameters as given in the 1D cases:

$$W_{2D}(n_x, N, n_y, N_y, M) = W(n_x, N) W(n_y, M) \quad \text{(Equation 4)}$$

$$W(n_x, N, n_y, M)_{HBRR\_1} = \left[2\sin\left(\frac{\pi n_x}{N}\right) - \sin^2\left(\frac{\pi n_x}{N}\right)\right]\left[2\sin\left(\frac{\pi n_y}{M}\right) - \sin^2\left(\frac{\pi n_y}{M}\right)\right] \quad \text{(Equation 5)}$$

$$W(n_x, N, n_y, N_y)_{Fermi} = \left[\frac{1}{1+\exp\left(\frac{|n_x-N_x/2|-r}{w}\right)}\right]\left[\frac{1}{1+\exp\left(\frac{|n_y-N_y/2|-r}{w}\right)}\right] \quad \text{(Equation 6)}$$

$$W(n_x, N_x, n_y, N_y)_{Exponential} = \exp\left[-\alpha\left(\frac{|n_x-\frac{N_x}{2}|}{N_x}\right)^p\right]\exp\left[-\alpha\left(\frac{|n_y-\frac{N_y}{2}|}{N_y}\right)^p\right] \quad \text{(Equation 7)}$$

II. Band-Pass (BP) Windowing Functions

The "Gamma Variate" function is used as the BP windowing function:

$$W_{BP}(|k|) = |k|^\alpha e^{-|k|/\beta}, \quad \text{(Equation 8)}$$

where $\alpha$=6 and $\beta$=3, and $|k|$ is normalized to $|k|$=25.6 $K_n/C$, in which $K_n$ is the "k-space distance" from the origin, and C is the "effective cut-off range" along a given direction, based on raw data array sizes. The window is only defined over the N×M acquired raw data size range, and can be either circular or elliptical, depending if N=M (or if $\epsilon$=1), with all values outside and range set to zeros:

In one implementation, $W(n_x, n_y) = t^6 \exp[-t/3]$,
where: t=25.6 $K_n$/C;
$K_n = \sqrt{(X_0^2 + Y_0^2)}$,
$C = (N_x/2) K_n/(X_0^2 + \epsilon^2 Y_0^2)$;
$\epsilon = (N/M)$;
$X_0 = n_x - (N/2) - 1$,
$Y_0 = n_y - (M/2) - 1$.

Note the BP windowing function has a 0/0 singularity at $K_n$=0, where it needs to be explicitly set to 0. Also, the peak value of the BP windowing function should be normalized to one as: $W_{BP} = 1/|\max(W_{BP})|$.

III. High-Pass (HP) Windowing Functions

The k-space HP windowing function can be created as magnitudes of two-dimensional inverse Fourier-Transform of LSI (Linear Spatially Invariant) Laplacian sharpening image domain convolution kernels, corresponding to the "strength" defined for LSI smoothing filters. Here are some normalized sharpening kernels for "LSI strengths" of 1.5, 2.0, 2.5 and 3.0, with the default preferably set to 2.5. The higher the strength number, the more sharpening after applying the windowing.

$$\text{Kernel}(LSI\ \text{strength } 1.5) = \begin{vmatrix} -0.0568 & -0.0947 & -0.0568 \\ -0.0947 & 0.6061 & -0.0947 \\ -0.0568 & -0.0947 & -0.0568 \end{vmatrix}; \quad \text{(Equation 9)}$$

$$\text{Kernel}(LSI\ \text{strength } 2.0) = \begin{vmatrix} -0.0915 & -0.1524 & -0.0915 \\ -0.1524 & 0.9756 & -0.1524 \\ -0.0915 & -0.1524 & -0.0915 \end{vmatrix}; \quad \text{(Equation 10)}$$

-continued

Kernel(*LSI* strength (Equation 11)

$$\text{Kernel}(LSI\text{ strength }2.5) = \begin{vmatrix} -0.1148 & -0.1913 & -0.1148 \\ -0.1913 & 1.2245 & -0.1913 \\ -0.1148 & -0.1913 & -0.1148 \end{vmatrix};$$

Kernel(*LSI* strength (Equation 12)

$$\text{Kernel}(LSI\text{ strength }3.0) = \begin{vmatrix} -0.1316 & -0.2193 & -0.1316 \\ -0.2193 & 1.4035 & -0.2193 \\ -0.1316 & -0.2193 & -0.1316 \end{vmatrix}.$$

Once the image domain Laplacian sharpening convolution kernel is selected, the corresponding k-space HP windowing function is created as:

$$W_{HP}=|FT(\text{Kernel}_{Laplacian}*)| \quad \text{(Equation 13)}$$

which is defined over the full input k-space data $K_0$ range, where Kernel$_{Laplacian}$* is the corresponding 3×3 Laplacian image domain sharpening convolution kernel, as defined above, zero-filled to the P×Q k-space container size (i.e., zeros everywhere, except for the center 3×3 area).

IV. HP Sharpening Mask Soft Thresholding Formulation

Soft thresholding, if desired for optimum results, may be implemented as when the input HP sharpening mask derived from the high-pass filtering of the normalized input image, $I_{HP}$, and the output soft threshold sharpening mask is $I_{HPST}$:

$$I_{HPST}=I_{HP}\times(|I_{HP}|/t)^p, \text{ if } |I_{HP}| \text{ is less than } t \quad \text{(Equation 14)}$$

with t=0.02 and p=1 in the preferred embodiment, which makes the sharpening strength roll down gradually below the threshold value t.

V. The Edge Mask Thresholding Formulation:

Automated adaptive hard thresholding of the BP derived edge masks may be implemented as:

$$I_{BPTH}=\min(I_{BP},\text{mean}(I_{Bp})/h)^2 \quad \text{(Equation 15)}$$

where h is a preset constant set to 0.36 in the preferred embodiment, while the mean($I_{BP}$)/h term represents the auto-threshold values. Varying the h value provides control of the edge mask acting range which, together with the LSI HP filter strength, controls the overall extent and spatial range of sharpening around the input image edges. This is followed by trimming the lower value to zero, and normalization:

$$I_{BPTH}=I_{BPTH}-\min(I_{BPTH});$$

$$I_{BPTH}=I_{BPTH}/\max(|I_{BPTH}|).$$

VI. The Edge Mask Feathering k-Space Low-Pass Formulation

Feathering (edge softening, or edge blurring) of the threshold edge mask feathering (from $I_{BPTH}$ to $I_{EM}$) is implemented in k-space with a low-pass Gaussian window:

$$W_{Gaussian}=\exp[-(n_x-(N/2))/(\sigma*(N/2))]\exp[-(n_y-(M/2))/(\sigma*(M/2))] \quad \text{(Equation 16)}$$

where, with $\sigma=\sigma_0*(\min(N, M)/128)$, and $\sigma_0=0.16$ in the preferred embodiment. The edge mask $I_{EM}|FT^{-1}[W_{Gaussian}*FT(I_{BPTH})]|$, created after the two-dimensional Fourier Transform, is again normalized as $I_{EM}=I_{EM}/\max(|I_{EM}|)$.

There are three major components in the exemplary embodiment:

1. A blurred (smoothed) version of the image, $I_{LP}$, which provides basic reduction of ringing artifacts and noise.

2. A sharpening mask $I_{HPST}$, which enhances edge sharpness and fine detail conspicuity.

3. A fuzzy (feathered) continuously valued ("gray scale") edge mask $I_{EM}$, which selects a portion of the $I_{LP}$ around the edges over which the sharpening mask $I_{HPST}$ is fully, or partially, or not applied to create the final result.

The use of the preferred windowing functions for k-space low-pass filtering may be optimal, because they tend to retain more image details (less general blurring) than other windowing functions for the same amount of Gibbs' ringing reduction.

Although an image sharpening method in the image domain can be approximately simplified into convolution with an equivalent Laplacian sharpening kernel in image domain, by replacing the image domain Laplacian kernel convolution with an equivalent k-space windowing process, the processing speed is greatly increased.

With incorrect threshold values, either the edges and details are not retained (e.g., when the threshold value is too low) or some ringing artifacts and noise may not be filtered out in the results (e.g., when the threshold value is too high). While a suitable edge mask threshold may be set and fine-tuned by hand, the automated edge mask threshold value deriving algorithm works quite well by deriving threshold values sufficiently close to the hand-set values, in most cases, and is especially accurate with main ringing artifact reduction targets, including low-resolution and medium-resolution T1-weighted and T2-weighted axial head and sagittal C-spine images.

As should now be apparent, the exemplary image processing/filtering method reduces Gibbs' ringing artifacts and some noise with a low-pass (LP) spatial frequency filter, while retaining and enhancing imaging details and edge definition through the use of threshold featured edge masks. The exemplary embodiment produces detail and edge enhancement with a high-pass (HP) filter, applied selectively over areas where the edge mask is "transparent". One important aspect to success depends upon careful matching of the characteristics of the LP, HP and edge extraction BP filter windowing functions, so that they will work together seamlessly (i.e., complementing each other in effective size and strength, etc.).

The exemplary embodiment depends upon correct specification of acquired raw k-space data array size. For example, when the PE matrix size (e.g., N) is specified incorrectly to the N×M array of raw data, the resulting image quality will deteriorate.

In summary, a fast low-pass k-space filtering (windowing) method with optimized parameters was first used to reduce Gibbs' ringing artifacts from data truncation, and to reduce general noise in the image. A simple and fast omni-directional k-space band-pass edge detection filter (window) is used to create edge masks in the image domain, after thresholding and feathering. Edges in the original images are selectively pasted back to the low-pass filtered images from throughout the edge mask.

Optionally, the result can be two-dimensionally Fourier-Transformed to an expanded k-space range container containing extrapolated k-space data naturally generated in the described process, which is then blended into the outer k-space portion of the mostly retained original acquired k-space raw data with 1D or 2D linear transition function(s), and then inverse two-dimensionally Fourier-Transformed back to the image domain, to create alternative filtered image results similar to the method described by, e.g., Amartur, et al., 1991 and 1991, and Constable, et al., 1991, resulting in less overall subjective impressions of overall sharpness, but may look more natural to viewers.

Parameters of the low-pass, high-pass and edge-detection k-space windowing functions can be individually adjusted to fit a wide range of objectives, such as pure (high-resolution) image denoising, and/or general images out of the MRI origin, where Gibbs' ringing is not a major problem.

The Fourier space two-dimensional low-pass filtering can be alternatively replaced by an image domain smoothing (weighted averaging) convolution. However, the k-space windowing method is computationally more efficient, plus, since all the MRI raw data are acquired in k-space, it tends to fit the nature of MR data flow better. The Fourier space two-dimensional high-pass filtering can be also alternatively replaced by image domain Laplacian or unsharp-masking-style sharpening convolution and calculation. However, again, the k-space windowing method is faster and the preferred workflow often fits the nature of MR data flow better.

The Fourier space two-dimensional edge-extraction filtering alternatively can also be replaced by a Canny-type image domain edge extractor without the usual final steps of edge thinning and connecting. However, once more, the k-space windowing method is faster and computationally more efficient and fits the nature of MR data flow better, even though its performance tends to be more easily affected by the noise in the input images. For images with very low signal-to-noise ratios (SNR), the Canny-type edge extractor may be still preferred, which can be also implemented as two k-space windowing steps and image domain combinations of the results.

The Fourier space two-dimensional low-pass filtering to feather the edge mask as the final step of the mask creation alternatively can be replaced by image domain smoothing convolution, but the space-space windowing method is faster and computationally more efficient.

The exemplary embodiment seamlessly integrates Gibbs' ringing artifact reduction and noise reduction with edge and detail enhancement to overcome the edge and detail blurring problem of some earlier low-pass filtering methods. Unlike sigma filtering and anisotropic diffusion methods, the exemplary embodiment produces beautiful natural-looking images retaining fine gradation in non-edge regions. In other words, the exemplary embodiments do not make MR images look "piece-wise constant" or "CT-like", but stay true to their MR origins. The improved conspicuity of true edges and low-contrast fine details help doctors to better visualize lesions, infarctions and anomalies after Gibbs' ringing artifacts are mostly removed and the overall level of image noise reduced.

The exemplary embodiments propose optimal or near optimal definitions of the two-dimensional Fourier space low-pass windowing function for Gibbs' ringing and noise reduction, and optimal or near optimal definitions of the fixed Fourier space two-dimensional high-pass filtering windowing function for detail enhancement and edge sharpening to the target type of low-resolution and medium-resolution MRI images.

The exemplary methods and systems described herein may be embodied in a variety of other forms, such as with arbitrary low-pass, band-pass (unidirectional, bidirectional, multi-directional and omni-directional) and high-pass windowing functions that produce different resulting images of different "flavors" that may fit certain image processing objectives better than the described embodiment.

The basic process may also involve a combining step that alternatively takes a form that selectively replaces or partially replaces part of the input k-space data $K_0$ with an improved version of the input k-space data, which is entirely or partially derived from the inverse Fourier-Transform of an image $I_F$, which is a combination of a sharpened version of the input image $I_0$, $I_{sharpen}$, a continuously valued gray scale edge mask image $I_{EM}$, and a low-pass filtered image $I_{LP}$, expressed as $(I_{EM})*I_{sharpen}+(1-I_{EM})*I_{LP}$, or a combination method substantially similar to $(I_{EM})*I_{sharpen}+(1-I_{EM})*I_{LP}$ mathematically. The improved k-space data may contain enhanced high-spatial frequency components outside the originally acquired N×M sized k-space data range, which is naturally extrapolated during the described filtering process.

While certain embodiments of the inventions have been described, these embodiments have been presented by way of example only, and are not intended to limit the scope of the inventions. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic resonance imaging (MRI) processor system comprising:
   memory configured to contain data arrays representing an image of patient anatomy in a k-space domain and in a spatial image domain,
   a data array in one of said domains being transformable into the other of said domains by Fourier Transformation; and
   at least one data processor configured to
   low-pass filter the data array, in at least one of
   (a) the k-space domain or
   (b) the spatial image domain of said image of patient anatomy,
   to produce a low-pass filtered data array in the k-space domain or the spatial image domain;
   wherein, if the low-pass filtered data array is produced in the k-space domain, it is transformed into the spatial image domain;
   band-pass filter the data array, in at least one of
   (a) the k-space domain or
   (b) the spatial image domain of said image of patient anatomy,
   to produce a band-pass filtered data array in the k-space domain or the spatial image domain;
   wherein, if the band-pass filtered data array is produced in the k-space domain, it is transformed into the spatial image domain;
   high-pass filter a data array, in at least one of
   (a) the k-space domain or
   (b) the spatial image domain of said image of patient anatomy,
   to produce a high-pass filtered data array in the k-space domain or the spatial image domain;
   wherein, if the high-pass filtered data array is produced in the k-space domain, it is transformed into the spatial image domain;
   threshold and feather said band-pass filtered data array in the spatial image domain to produce an edge mask data array;
   multiply said edge mask data array with said high-pass filtered data array in the spatial image domain; and
   add the result of the multiplying to said low-pass filtered data array in the spatial image domain to produce a Gibbs' noise filtered image data array in the spatial image domain.

2. An MRI processor system as in claim 1, wherein at least said band-pass filtering is performed in the k-space domain and then Fourier-Transformed to produce magnitude data for a respectively corresponding pass-band filtered data array in the spatial image domain, said band-pass filtering in k-space being performed using a filtering windowing function having omni-directionality in k-space.

3. An MRI processor system as in claim 1, wherein at least said band-pass filtering is performed in the k-space domain and then Fourier-Transformed to produce magnitude data for a respectively corresponding pass-band filtered data array in the spatial image domain, said band-pass filtering in k-space being performed using a filtering windowing function that has either omni-directional or separate bidirectional filters corresponding to Canny-type image edge extractors.

4. An MRI processor system as in claim 1, wherein:
said low-pass, band-pass and high-pass filtering are performed in the k-space domain and then two-dimensionally Fourier-Transformed to produce magnitude data for respectively corresponding filtered data arrays in the spatial image domain.

5. An MRI processor system as in claim 1, wherein:
said low-pass and band-pass filtering are performed in the k-space domain and then two-dimensionally Fourier-Transformed to produce magnitude data for respectively corresponding low-pass and band-pass filtered data arrays in the spatial image domain.

6. An MRI processor system as in claim 3, wherein:
said data arrays in the k-space domain are two-dimensional data arrays having P×Q array elements;
at least said low-pass and band-pass filtering is effected using respectively corresponding window filtering arrays that are each sized to substantially match the N×M size of the acquired raw k-space data array, or such array after basic preprocessing steps, being filtered, where N<P and M<Q; and
said high-pass filtering is effected using a respectively corresponding filtering windowing function that is sized to substantially match the size of a k-space array container having substantially only said N×M size data array therewithin, but otherwise having zero values or small values resulting from previous non-linear processing.

7. An MRI processor system as in claim 1, wherein said high-pass filtered data array is soft thresholded in the spatial image domain to produce a soft thresholded high-pass filtered data array before multiplication with said edge mask data array.

8. An MRI processor system as in claim 1 in combination with an MRI gantry including a static field magnet, gradient field coils and at least one radio frequency (RF) coil defining an imaging volume and an MRI data acquisition sub-system configured to control said gradient field and RF coils, to store into said memory an N×M array of raw MRI data in k-space as said data array representing an image, wherein N equals an effective number of phase-encoding increments in a Gpe phase encoding dimension or a target dimension after partial Fourier or parallel imaging preprocessing and M equals an effective number of frequency-encoded samples obtained in a Gro read-out dimension or a target dimension after partial Fourier or data processing during an MRI data acquisition scan sequence.

9. An MRI processor system as in claim 1, wherein said data arrays representing an image of patient anatomy stored in said memory are generated by inverse two-dimensional Fourier-Transformation of a digitized image of patient anatomy in the spatial image domain into the k-space domain where the data array stored in said memory is an N×M or P×Q array in k-space data representing said image of patient anatomy, where N<P and M<Q.

* * * * *